March 16, 1954     A. WRABEL     2,672,160
PNEUMATIC VALVE AND STEM CAP
Filed June 1, 1950
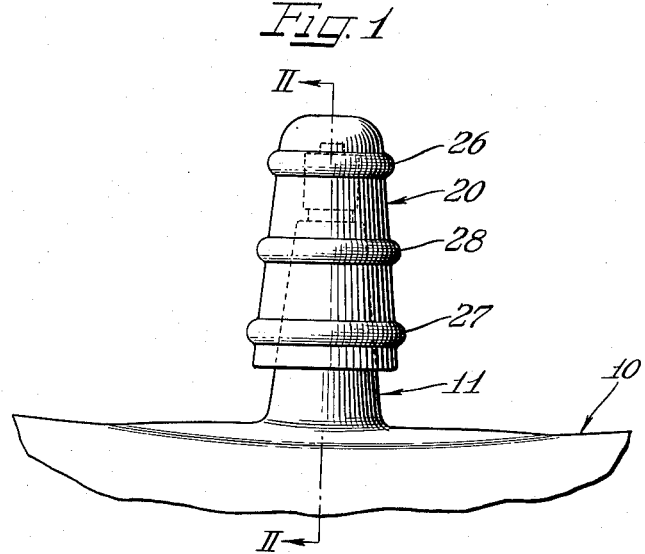
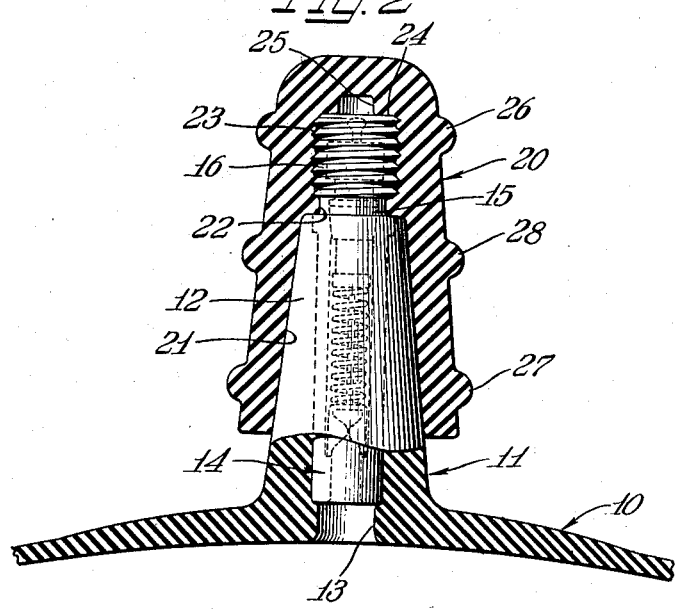
Inventor
Adam Wrabel
by The firm of Charles H. Lill    Attys

Patented Mar. 16, 1954

2,672,160

UNITED STATES PATENT OFFICE 2,672,160

PNEUMATIC VALVE AND STEM CAP

Adam Wrabel, Chicago, Ill.

Application June 1, 1950, Serial No. 165,475

1 Claim. (Cl. 138—89.2)

The present invention relates to a pneumatic valve and stem cap and more particularly to a cap for a pneumatic valve, such as an automotive tire valve, the cap being dirt- and fluid-pressure-tight.

The provision of an efficient dirt and fluid pressure seal for automotive tire valves or the like has long presented a serious, difficult problem in the art. The conventional tire cap, as generally employed, is merely an inverted metal cup which is threadedly retained on the metal valve stem or housing. Such caps readily become loosened and lost in use, and the resultant entry of moisture and/or dirt into the valve mechanism is a common cause of valve failure. Consequently, various forms of resilient caps have been proposed, but such caps have not been generally accepted for one or more reasons, including expense of manufacture, difficulty of installation and inefficiency of operation. As an additive cause of valve failure, the valve stem itself upon striking a foreign object, such as a stone or the like, may become loosened or deformed from the inner tube or tire structure, again resulting in a fluid-pressure leakage.

A serious defect which is overcome by this invention resides in the fact that deterioration of the rubber due to heat, dirt or the like causes the rubber to become loose from the metal tube in the interior of the stem with resultant leakage of air. By providing a cap which tightly engages the exterior of the rubber stem for a substantial portion of its length I maintain the rubber and metal of the stem in intimate contact and obviate such leakage.

The present invention now provides an improved and novel form of tire valve cap or the like which is inexpensive to manufacture, easily employed, dirt-and-fluid-pressure-tight, and effective to protect the valve itself against shock or rough handling.

More particularly, the protective cap structure of the present invention resiliently and circumferentially embraces the tire valve throughout substantially the entire length of the valve. The cap is made of resilient material, such as a natural or synthetic rubber or other type of elastomer, and this resilient construction results in the exertion of an inward pressure on the valve itself which serves not only to retain the cap in position but also to urge the cap into intimate dirt-and-fluid-pressure-tight contact with the valve. Preferably, spaced peripheral portions of the cover are thickened so as to increase the resilient pressure exerted inwardly on the valve by the cap at those points where the maximum sealing against fluid pressure and incidental dirt is desired.

The valve cap is sealed against the valve at no less than three separate spaced circumferential areas along the valve length. The first sealing contact is maintained at the valve extreme end with the valve cap being adapted to overlie the end of the valve in very tightly fitting relation therewith. A second point of sealing contact is maintained at that portion of the valve stem which joins a terminal threaded portion of the valve with the valve stem proper. An additional elongated area of circumferential sealing contact occurs along the length of the valve stem proper, which is in closely mating relation with the valve cap.

It is, therefore, an important object of the present invention to provide an improved pneumatic valve cap which is dust- and fluid-pressure-tight.

Another important object of the present invention is to provide an improved pneumatic valve and cap assembly including means on the cap in closely fitting, resilient, extended surface contact with the valve.

It is a further important object of the present invention to provide an improved valve stem cap which comprises a resilient member in extended surface contact with substantially the entire length of a pneumatic valve, the cap closely and peripherally engaging the valve and providing a plurality of separate specific fluid-pressure-sealing areas along the length of the valve.

Still another important object of the present invention is to provide an improved valve and cap assembly for a tire or the like including a valve stem, a reduced intermediate valve portion and a threaded valve terminal portion, the cap being in tightly gripping resilient engagement with substantially the entire length of the valve and in fluid-pressure-tight engagement with the valve stem, the intermediate valve portion, and the extreme end of the terminal portion.

Other and further important objects of the present invention will be apparent from the disclosures in the specification and the accompanying drawings.

On the drawings:

Figure 1 is a side elevational view of a pneumatic valve provided with the sealing cap of the present invention; and Figure 2 is a sectional view, with parts shown in elevation, taken along the plane II—II of Figure 1.

As shown on the drawings:

In Figure 1, reference numeral 10 refers generally to a pneumatically inflated article, such as an automotive tire tube, a bicycle tire tube, a life preserver, a rubber boat, or the like.

The article 10 is provided with a valve assembly 11 including an elongated valve neck 12 of generally frusto-conical outer circumferential contour and having an internal bore 13 adapted to receive therein a valve stem assembly 14. The valve stem assembly 14 projects outwardly beyond the neck 12 to provide a reduced diameter intermediate portion 15 housing a portion of the valve operating mechanism and connected to a terminal exteriorly threaded portion 16 for housing the valve stem actuating mechanism.

A valve stem cap 20 is internally bored for telescopic assembly over the valve neck 12. The cap 20 is formed of suitable resilient material, such as a natural or synthetic rubber or other elastomer. The valve cap is generally frusto-conical in configuration and is internally recessed to receive the valve neck and valve portions projecting therebeyond. The interior valve recess includes an outer portion 21 generally frusto-conical in interior contour and adapted to snugly receive therein the neck 12.

Immediately adjacent the frusto-conical portion 21 there is provided an inwardly extending annular shoulder portion 22 projecting into the interior of the cap recess to snugly and resiliently fit the reduced diameter joining or intermediate portion 24 of the valve stem housing.

The bore of the cap 20 is slightly enlarged inwardly of the shoulder 22 to provide a chamber 23 for the snug reception of the threaded terminal portion 16 of the valve stem housing. The chamber 23 terminates in a second inwardly directed shoulder 24 which overlies the end of the terminal portion 23. The cap bore itself terminates in a reduced chamber 25 directly overlying the central portion of the threaded terminal end 16.

The outer peripheral portions of the cap are provided with three peripherally enlarged, axially spaced ribs, including a first rib 26 radially aligned with the threaded terminal portion 23 of the valve housing, a second rib 27 encircling the lower open annular end of the cap, and an intermediate rib 28 encircling the upper portion of the frusto-conical valve neck recess 21.

It will thus be seen that the cap of the present invention provides means for peripherally and resiliently engaging the exterior surfaces of the valve assembly 11 throughout substantially the entire axial length thereof. This resilient engagement is due to the inherent resiliency of the material from which the cap is made, and such engagement is enhanced by the thickened cap portions provided by the peripheral ribs 26–28, inclusive.

At least three definite fluid and dirt-tight seals are provided by the cap in cooperation with the valve including a first elongated frusto-conical sealing engagement between the cap recess 21 and the valve neck 12. The shoulder 22 is in resilient sealing engagement with the corresponding valve housing portion 15, the shoulder 22 extending into the peripheral recess provided by the reduced portion 15, and the shoulder being tightly bottomed against the terminal end of the valve neck 12 and confined between the valve neck and the enlarged threaded valve housing portion 16. The third seal is provided by the radially inwardly shoulder 24 of the cap, which overlies the extreme end of the valve assembly as well as by the recess 23 which provides recess walls which are resiliently deformed into the threads of the valve housing terminal portion 16.

In addition to the sealing function of the cap, the cap also serves to protect the valve assembly from dirt and from shock imparted thereto by striking of foreign objects, such as stones and the like, during driving of a vehicle employing a pneumatic tire. Further, the valve neck 12 is formed of rubber or the like elastomer, as is the cap 20, so that enhanced sealing at the frusto-conical valve neck is obtained.

Another advantage resides in the easy installation and removal of the tire cap. To install the cap on the valve, it is merely necessary to insert the valve cap over the valve and simply twist the valve cap into fully seated engagement with the valve. Removal of the cap is fully as simple as installation, removal requiring only twisting of the cap followed by its removal axially from the valve.

The peripherally enlarged ribs 26–28, inclusive, provide conveniently spaced, readily employed band stops for such installation and/or removal.

It will be appreciated that the cap may be made of greater or lesser axial length to accommodate valve assembly of any given size, and if the valve cap is longer than desired, it may be accommodated to a relatively short valve assembly by merely severing the lower or inner portion of the cap skirt adjacent the valve assembly neck.

It will be understood that modifications and variations may be effected without departing from the scope of the novel concepts of the present invention.

I claim as my invention:

In combination; a pneumatic valve assembly comprising a frusto-conical rubber neck portion having an internal bore, a metallic valve stem assembly extending within said bore and having a reduced diameter intermediate portion projecting outwardly beyond said neck portion and a terminal exteriorly threaded portion extending beyond said reduced diameter intermediate portion; and a cap telescoping over said rubber neck portion and said intermediate portion and said threaded terminal portion to provide a fluid pressure seal for said valve assembly; said cap comprising a resilient member having an interior recess including a lower frusto-conical portion in gripping contacting relation to said valve neck portion and spaced radially inwardly extending shoulders; the lower one of said shoulders extending in snug contacting relation with the end of said neck portion, said reduced intermediate portion and the lower edge of said threaded terminal portion; the upper one of said shoulders overlying in snug contacting relation the upper end of said threaded terminal portion; and the walls of said resilient member between said shoulders being deformed into snug conforming contacting relation to the threads of said terminal portion; whereby the valve assembly is sealed without the use of an internally threaded metallic cap.

ADAM WRABEL.

References Cited in the file of this patent

UNITED STATES PATENTS

| Number | Name | Date |
|---|---|---|
| 1,254,975 | Brown | Jan. 29, 1918 |
| 1,398,316 | Collins | Nov. 29, 1921 |
| 1,451,719 | Stephens | Apr. 17, 1923 |
| 1,473,032 | Freedlander | Nov. 6, 1923 |

FOREIGN PATENTS

| Number | Country | Date |
|---|---|---|
| 465,507 | France | of 1914 |